Patented Nov. 23, 1926.

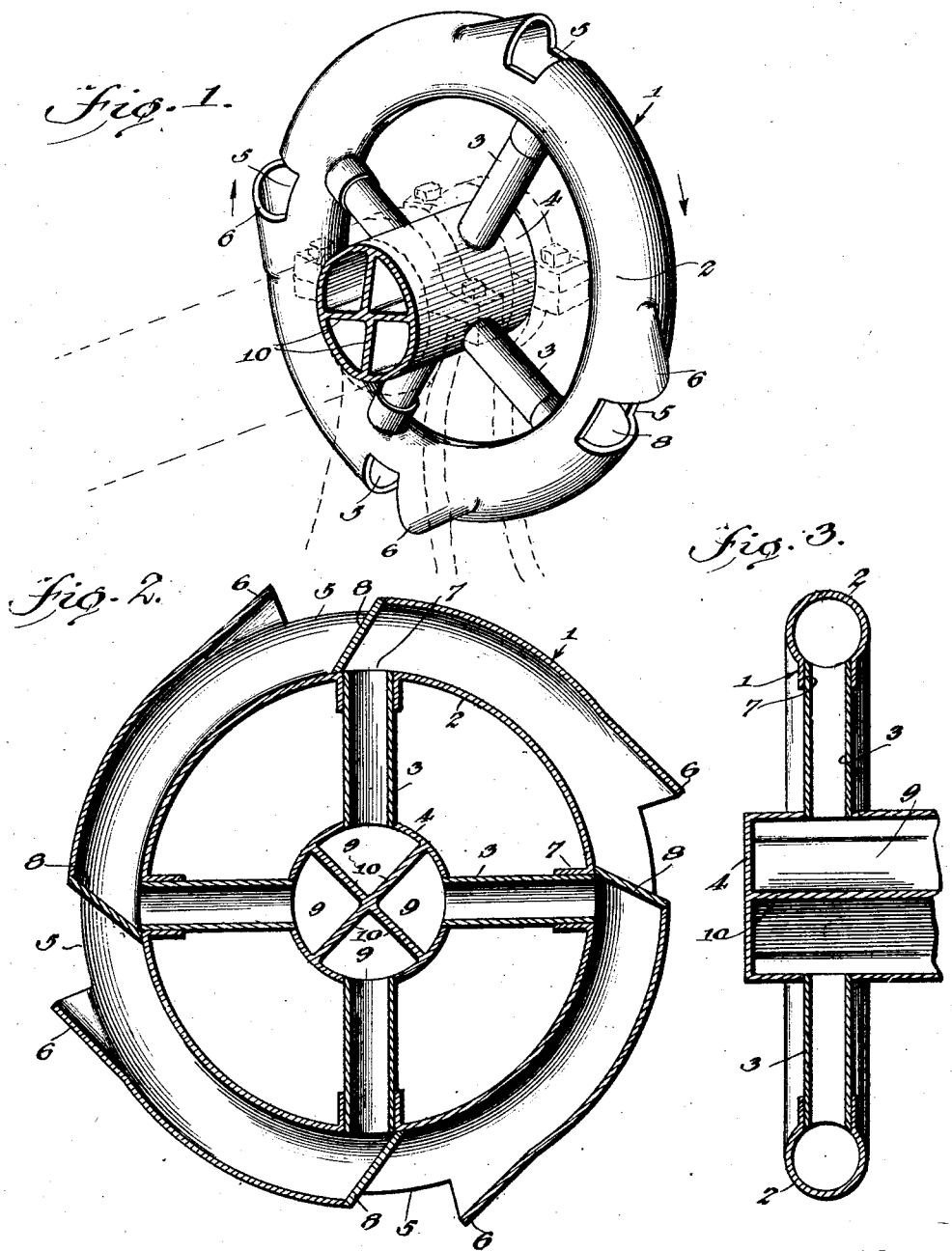

1,607,884

UNITED STATES PATENT OFFICE.

WADE H. FARLEY, OF MULESHOE, TEXAS.

WATER WHEEL.

Application filed March 18, 1925. Serial No. 16,453.

This invention relates to an improvement in water wheels especially designed for use in elevating water and aims to provide a water wheel of this character which is of simple though strong and durable construction, reliable and efficient in operation and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawings forming a part of this specification and in which:

Figure 1 is a perspective view showing a water wheel constructed in acordance with the present invention, Figure 2 is a view in section taken in the plane of the wheel, and Figure 3 is a view in section taken in a plane extending longitudinally and centrally of the wheel as indicated by line 3—3 of Figure 2.

Referring to the drawings the numeral 1 designates generally a water wheel constructed in accordance with the present invention. The water wheel includes a continuous annular rim 2 which is hollow and of circular cross section.

The rim 2 is carried by and communicates with the interior of the radial and hollow spokes 3 which are in turn connected to a hollow hub 4, suitable couplings or unions being employed to effect the necessary connections. The hub 4 is connected to and rotated by a hollow shaft and is journaled in suitable bearings, as indicated in dotted lines in Fig. 1. The hub 4 is rotated from the hollow shaft and the latter is actuated from any suitable source of power.

At spaced points around the outer wall of the rim 2 inlet openings 5 are formed. Collectors, designated generally at 6, are provided adjacent each inlet. Each collector 6 is preferably of the shape and form shown in the drawings and includes an outwardly deflected portion of the outer wall of the rim.

In the inner wall of the rim openings 7 are provided and these openings which constitute the outlets receive the outer ends of the hollow spokes 3. The outer ends of the hollow spokes 3 are suitably secured to the walls of the openings 7. Between adjacent inlet and outlet openings inclined circular partitions 8 are arranged, the partitions dividing the interior of the hollow rim into separate compartments and preventing escape of water which enters through one inlet out through another inlet, the water being constrained to flow from the hollow rim into the hollow spokes and thence into the hollow hub. The hollow hub may be divided up into compartments 9 by partitions 10.

When the water wheel is rotated in the direction indicated by the arrows in Fig. 1 the collectors 6 will collect and deflect water into the hollow rim and the water will be forced by the rotation of the wheel into the spokes 3 and hub 4 and thence to the point of distribution. Preferably the wheel is so rotated that when the collectors are presented to the water the water will tend to flow into the same.

I claim:

1. A water wheel for use in elevating water and having a continuous annular rim of circular cross section, said rim being hollow, the outer wall of the rim having inlet openings at spaced points and having collectors adjacent the openings, said collectors including outwardly extending portions of the rim on one side only of the inlet openings, the inner wall having outlet openings, and means for carrying the water away from the outlet openings.

2. A water wheel for use in elevating water and having a continuous annular rim of circular cross section, the outer wall of the rim having inlet openings at spaced points and having collectors adjacent the openings, the inner wall having outlet openings, hollow spokes connected with the outlet openings, a hollow hub connected with said spokes, and inclined circular partitions in the hollow rim between adjacent inlet and outlet openings, the inclination of the partitions causing them to deflect the water into the outlet opening.

3. A water wheel for use in elevating water and having a continuous annular rim of circular cross section, said rim being hollow, the outer wall having inlet openings at spaced points and having collectors adjacent the openings, the inner wall having outlet openings, partitions in the hollow rim between adjacent inlet and outlet openings, hollow spokes connected with the outlet openings, and a hollow hub connected with said spokes, said hub having partitions defining compartments.

WADE H. FARLEY.